UNITED STATES PATENT OFFICE.

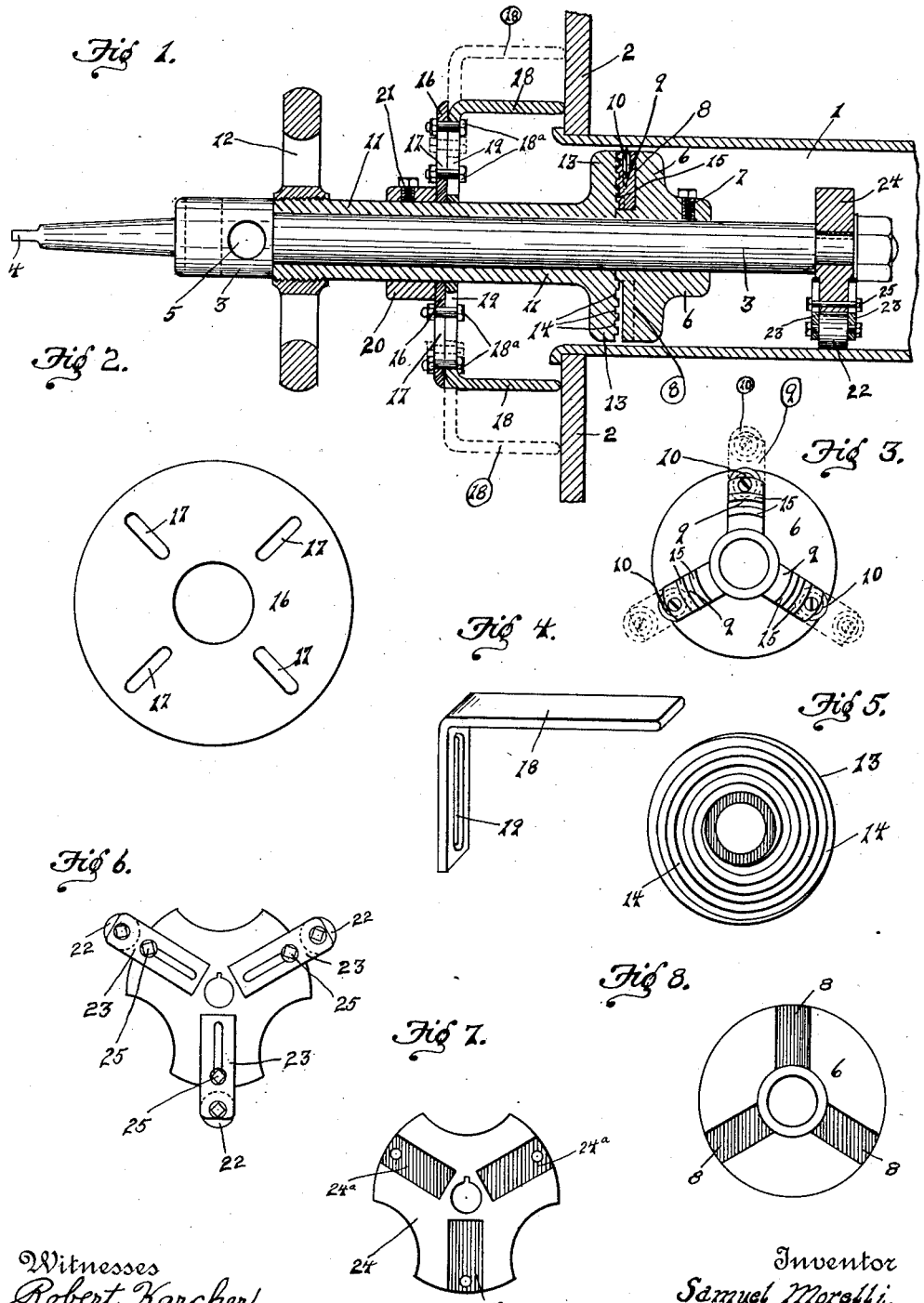

SAMUEL MORELLI, OF LEETONIA, OHIO.

PIPE-CUTTING TOOL.

1,100,760.  Specification of Letters Patent.  Patented June 23, 1914.

Application filed December 24, 1913. Serial No. 808,607.

*To all whom it may concern:*

Be it known that I, SAMUEL MORELLI, a citizen of the United States, residing at Leetonia, in the county of Columbiana and State of Ohio, have invented certain new and useful Improvements in Pipe-Cutting Tools, of which the following is a specification.

My invention relates to improvements in pipe cutting tools in which there is employed a series of cutting disks and anti-friction rollers designed to be rotated by means of a shaft.

The objects of the present invention are, first, to provide a tool whereby the cutting disks are fed outward from the axis of the rotating shaft from time to time, second, to provide means whereby the tool can be adjusted with reference to the tube designed to be cut, and third, to hold the tool in proper parallel relationship with reference to the tube regardless of the size or diameter designed to be cut. These objects, together with other objects readily apparent to those skilled in the art, I attain by the construction illustrated in the accompanying drawings, although my invention may be embodied in a variety of other mechanical forms, the construction illustrated being chosen by way of example.

In the accompanying drawing—Figure 1 is a longitudinal section showing the tool placed in position for use. Fig. 2 is a face view of the rest or gage holding disk. Fig. 3 is a view of the cutting disk, showing the cutters and their parts in proper relationship with reference to the disk. Fig. 4 is a detached view of one of the rests or gages. Fig. 5 is a face view of the cutter expanding disk. Fig. 6 is a face view of the steadying disk and its different parts. Fig. 7 is a face view of the steadying disk showing the rollers and bars detached. Fig. 8 is a face view of the cutter carrying disk, showing the cutters removed.

Similar numerals of reference indicate corresponding parts in all the figures of the drawing.

In the accompanying drawing, 1 represents the tube designed to be cut, showing the same properly connected to a boiler end or head 2, the arrangements of the boiler end or head being shown conventionally. The actuating shaft 3 is formed of any desired length, reference being had to convenience in use, which shaft is rotated in any well known manner and for light work an ordinary crank may be attached to the angled end 4 or an actuating bar may be placed through the aperture 5 or any other means may be employed to rotate the shaft 3. Upon the shaft 3 is located the cutter disk 6, which cutter disk is held in position upon the shaft 3 by means of the set screw 7 or its equivalent. The cutting disk 6 is provided with the radial grooves 8, which grooves are for the purpose of receiving and holding the cutter bars or blocks 9, which cutter bars or blocks are slidably mounted in the groove 8. To the bars or blocks 9 are journaled the cutting disks 10, which cutting disks are of the usual construction such as are commonly used for producing a sheer cut when in contact with the material designed to be acted upon.

Upon the shaft 3 is rotatably mounted the hollow shaft 11, to which hollow shaft is attached by screw threads or otherwise the feed wheel 12, which feed wheel is of the usual construction and is to be actuated in substantially the same manner as the feed wheel to an ordinary and common drill, such as used in machine shops. The hollow shaft 11 is provided with the cutter expanding disk 13, which may be formed integral with said hollow shaft or it may be made separate and attached in any convenient and well known manner. The working face of the disk 13 is provided with the spiral groove 14, which spiral groove is for the purpose of receiving the ribs 15 formed upon the cutting bars 9, said ribs being curved to correspond with the curvature of the spiral groove and of such a size that they will properly fit in the spiral groove. Upon the hollow shaft 11 is located the disk 16, which disk is provided with the elongated slots 17, which slots are for the purpose of providing means for adjustably connecting the rest or gage bars 18, which rest or gage bars are also provided with the slots 19, the slotted member and the rest member being located at substantially right angles to each other as illustrated in Figs. 1 and 4.

It is well understood that boiler tubes and other tubes are formed of various sizes and in some instances it may be desirable to adjust the gage or rest proper to properly adjust the tool for use. By providing means for adjusting the rest or gage members 18 in a radial direction I can provide for the proper connection of the rest or gage regardless of the size of the tube proper to be cut to the limit of the adjustment of the rest or gage, said gage or rest members being held in fixed adjustment by means of the clamping bolts 18ª, which adjustment should be sufficient for the various sizes of tubes in general use.

Upon the hollow shaft 11 is located the collar 20, which collar is for the purpose of holding the shaft 3 and the hollow shaft 11 against inward endwise movement, said collar when properly adjusted and held in fixed adjustment by means of the set screw 21 will abut against the disk 16 and thereby hold the cutting disks 10 together with their different parts in proper predetermined positions.

It will be understood that by adjusting the collar 20 to and from the wheel 12 the cutters 10 can be adjusted so as to cut the tube at any desired distance from the end of the tube. In some instances it may be desirable to cut the tube, say one inch from the end of the tube and in other instances two or three inches and by adjusting the collar 20 and afterward adjusting the tool the tube will be cut at the desired point. It is well understood that there should be no wabbling movement of the shaft 3 during the time the pipe is being cut and in order to provide means for preventing any wabbling the rollers 22 are provided, which rollers are so located that they will roll upon the inner surface of the tube.

For the purpose of providing for the proper holding of the shaft 3 with reference to different sized tubes, the rollers 22 are journaled in the adjustable carrying bars 23, which carrying bars are adjustably attached to the disk 24, which disk is mounted upon the inner end of the shaft 3. The rollers 22 are held in proper adjustment by means of the clamping bolts 25.

It is well understood that means must be provided for moving the cutting disks 10 outward during the time of the cutting action and in order to provide for what might be termed feeding the cutting disks the feed wheel 12 is provided, which feed wheel when rotated will rotate the hollow shaft 11, which in turn rotates the disk 13 and by means of the spiral groove the rotation of said disk will move the cutting disk carrying bars or blocks outward thereby providing for the proper cutting of the material designed to be cut. It is understood that in boiler tubes, especially the thickness of the metal is not great and hence the outward radial movement of the cutting disks will not be for any great distance, simply to move the same outward after they have been adjusted for cutting action a distance equal to the thickness of the metal from which the pipes are composed or made up.

For the purpose of preventing any pivotal movement of the roller carrying bars 23, the disk 24 should be provided with grooves 24ª so that any frictional contact of the rollers upon the surface of the tubes will not have a tendency to rock the roller carrying bars. By providing the grooves 24ª a single clamping bolt for each pair of bars will hold said bars in fixed positions after they have been adjusted and the rollers brought into position for contact with the inner surface of the tube. In some instances it may be desirable to drive the shaft carrying the cutters by motive power, other than manual power and in such cases the shaft can be rotatably coupled to an electric motor or other source of power.

Having fully described my invention what I claim as new and desire to secure by Letters Patent, is—

1. In a device of the character described, the combination of a shaft having fixed thereto and rotatable therewith a disk, said disk provided with radial grooves, bars located in the grooves of the disk, said bars provided with ribs, cutting disks carried by the bars, a hollow shaft mounted upon the shaft provided with the cutting disk, a disk mounted upon the hollow shaft, said disk provided with a spiral groove, said spiral groove adapted to move the cutting disk bars endwise, a disk secured to the inner end of the shaft, said disk provided with adjustable bars, anti-friction rollers journaled in said bars and means for holding the adjustable bars in fixed adjustment, a disk located concentric with the hollow shaft, said disk provided with radial elongated slots, gage members adjustably connected to said disk, said gage members adapted for abutment against a boiler head and a collar located upon the hollow shaft and adapted for contact with the disk provided with the gage arms, substantially as and for the purpose specified.

2. In a device of the character described, the combination of a shaft having fixedly mounted thereon a disk provided with radial grooves, bars provided with cutting disks, said bars slidably mounted in the grooves, a hollow shaft rotatably mounted upon said first mentioned shaft, and means for moving the slidable bars endwise, a slotted disk mounted upon the hollow shaft, gage bars adjustably connected to said disk and an adjustable collar adapted to abut against the disk carrying the gage bars.

In testimony that I claim the above, I have hereunto subscribed my name in the presence of two witnesses.

SAMUEL MORELLI.

Witnesses:
W. E. WARREN,
J. R. STRATTON.

Copies of this patent may be obtained for five cents each, by addressing the "Commissioner of Patents, Washington, D. C."